(12) United States Patent
Wang

(10) Patent No.: US 6,674,552 B1
(45) Date of Patent: Jan. 6, 2004

(54) SCANNER HAVING SYNCHRONIZATION DYNAMIC RANDOM ACCESS MEMORY SCANNER AND ITS RELATED MEMORY ACCESS METHOD

(75) Inventor: Kuo-Jeng Wang, Kaohsiung (TW)

(73) Assignee: Umax Data Systems, Inc., Hsinchu (TW)

( * ) Notice: Subject to any disclaimer, the term of this patent is extended or adjusted under 35 U.S.C. 154(b) by 632 days.

(21) Appl. No.: 09/711,839

(22) Filed: Nov. 13, 2000

(51) Int. Cl.⁷ .............................. H04N 1/04; G06F 5/00

(52) U.S. Cl. ........................................ 358/474; 710/52

(58) Field of Search .................... 358/474, 505, 358/482, 444; 710/52, 53; 711/100

(56) References Cited

U.S. PATENT DOCUMENTS 6,525,783 B1 * 2/2003 Kim et al. .................. 348/714

* cited by examiner

*Primary Examiner*—Edward Coles
*Assistant Examiner*—Jason Sherrill
(74) *Attorney, Agent, or Firm*—J.C. Patents

(57) ABSTRACT

A scanner having a synchronization dynamic random access memory and its memory access method. The scanner has an image processor for processing digital image signals, a SDRAM compensation memory unit for holding compensation data, a SDRAM image archiving memory unit for holding processed digital image data and an input/output device for connecting with an external device. A plurality of buffers couple the compensation memory unit with the image processor, the image processor with the image archiving memory unit and the image archiving memory unit with the input/output device.

11 Claims, 3 Drawing Sheets

SCANNER HAVING SYNCHRONIZATION DYNAMIC RANDOM ACCESS MEMORY SCANNER AND ITS RELATED MEMORY ACCESS METHOD

BACKGROUND OF THE INVENTION

1. Field of Invention

The present invention relates to a type of scanner and its internal memory access method. More particularly, the present invention relates to a scanner having synchronization dynamic random access memory (SDRAM) and its related memory access method.

2. Description of Related Art

At present, the most common type of memory to be used inside a scanner is dynamic random access memory (DRAM). Some high-grade scanners may use synchronization dynamic random access memory (SDRAM). Although a scanner that uses SDRAM performs image processing much faster than an ordinary scanner that uses DRAM, SDRAM scanners do have some defects that prevent a full utilization of their power.

In general, SDRAM use a burst transmission mode to access data. Hence, a large number of memory address transmissions using the data bus may be omitted and a large amount of data may be accessed at the same time. However, the digital signal processor (DSP) and the input/output (I/O) device inside a scanner employ a bit-by-bit data transmission mode. Hence, even when the scanner uses SDRAM as the memory for holding compensation data or images produced by an image processor, the high transmission speed possible for SDRAM in the burst mode is not realized.

SUMMARY OF THE INVENTION

Accordingly, one object of the present invention is to provide a scanner having synchronization dynamic random access memory (SDRAM) and its related memory access method. The SDRAM inside the scanner serves as a compensation memory for holding compensation data and as an image memory for holding processed images. A buffer capable of holding all the transmission data when the SDRAM operates in a burst mode operation is set up between the compensation memory and a digital signal processor (DSP), between an image processor and the image memory and between the image memory and an input/output device. By setting up buffers inside the scanner, SDRAM can fully utilize the available burst mode to increase the data access rate.

To achieve these and other advantages and in accordance with the purpose of the invention, as embodied and broadly described herein, the invention provides a type of scanner that uses synchronization dynamic random access memory. The scanner includes an image processor, a compensation memory, an image archiving memory, an input/output device and a plurality of buffers. The image processor processes digital image signals. The compensation memory is a synchronization dynamic random access memory (SDRAM) for holding digital image signals processed by the image processor. The input/output device is connected to an external device for mutual data transmission. The plurality of buffers couples the compensation memory with the image processor, the image processor with the image archiving memory and the image archiving memory with the input/output device. Compensation data are transmitted to corresponding buffers in a burst mode and then relayed from the buffers to the image processor serially. The image processor relays the processed digital image signals to the corresponding buffers and then transmits the signals to the image archiving memory in a burst mode. Finally, the processed digital image data in the image archiving memory is transmitted to corresponding buffers in a burst mode and then relayed from the buffer regions to the input/output device serially.

This invention also provides a type of scanner with synchronization dynamic random access memory. The scanner includes a single cluster data access device, a synchronization dynamic random access memory (SDRAM) and a buffer. The single cluster data access device is able to access a cluster of data at a time. The SDRAM can transmit a plurality of data clusters in a burst mode of transmission. The buffer is coupled to the single cluster data access device and the SDRAM. The buffer transmits a single cluster of data to the single cluster data access device but transmits a plurality of data clusters to the SDRAM in a burst mode.

This invention also provides a memory access method for a type of scanner having a synchronization dynamic random access memory (SDRAM). The SDRAM is capable of transmitting a large volume of data every time a burst mode is executed. A buffer having the capacity to hold the data transmitted in a burst mode is provided. Data within the SDRAM is transmitted to the buffer in a burst mode. The data are next relayed from the buffer to the data devices that require the data serially.

This invention also provides an alternative memory access method for a type of scanner having a synchronization dynamic random access memory (SDRAM). The SDRAM is capable of transmitting a large volume of data every time a burst mode is executed. A buffer having the capacity to hold the data transmitted in a burst mode is provided. Data within a storage device is relayed to the buffer serially. The data stored within the buffer is transmitted to the SDRAM in a burst mode.

In brief, the SDRAM serves as compensation memory and image archiving memory inside a scanner. In addition, buffers each capable of holding at least a volume of data in a SDRAM burst mode transmission is provided. The buffers couple between the compensation memory and the image processor, between the image processor and the image archiving memory and between the image archiving memory and the input/output device. With this setup, the burst mode of the SDRAM can be fully utilized to increase the operating speed of the scanner.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
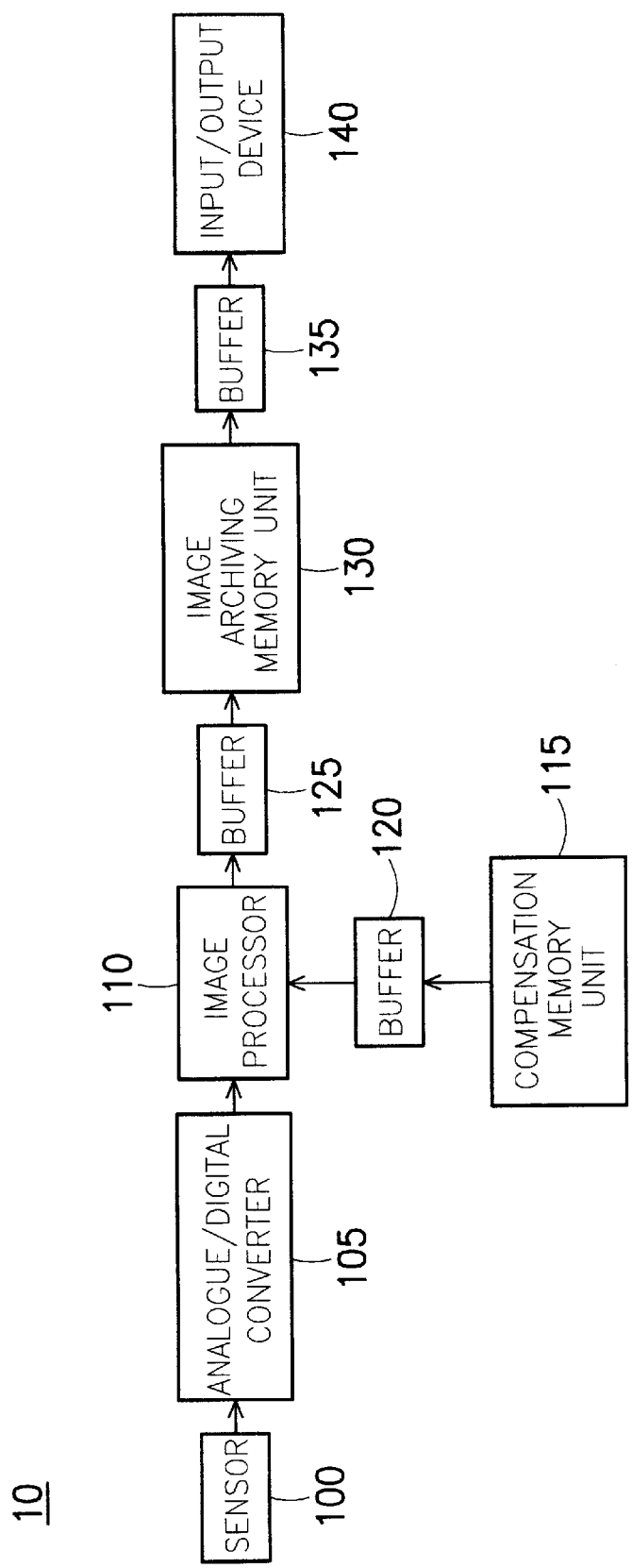
FIG. 1 is a block diagram showing the architectural setting of the scanning system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Aside from synchronization dynamic random access memory (SDRAM), which is capable of transmitting several data clusters in a single data transmission operation, most other devices inside a scanner are capable of transmitting only a single cluster of data at a time. Here, a single cluster of data refers to a pixel or corresponding amount of data such as compensation data needed to process a pixel. In subsequent description, all these devices capable of only holding a single cluster of data are called single data cluster access devices. Single data cluster access devices inside a scanner include, for example, the digital signal processor (DSP) and the input/output device.

Due to the presence of a plurality of single data cluster devices inside a scanner, burst mode transmission of data from an SDRAM is difficult to utilize. However, by coupling a buffer between a single data cluster access device and a SDRAM, burst mode transmission can be fully utilized to increase the scanning speed of a scanner.

FIG. 1 is a block diagram showing the architectural setting of the scanning system according to one preferred embodiment of this invention. As shown in FIG. 1, a scanner 10 includes a sensor 100, a digital/analogue converter 105, an image processor 110, a compensation memory unit 115, an image archiving memory unit 130, an input/output device 140 and a plurality of buffers 120, 125, 135. Analogue brightness level obtained by document scanning is picked up by the sensor 100 and then transmitted to the analogue/digital converter 105. The analogue/digital converter 105 transforms the brightness level into digital image signals. The digital image signals are transmitted to the image processor 110 for subsequent processing.

When the image processor 110 is processing the image signals, compensation data must be retrieved from the compensation memory unit 115 so that brightness level compensation or calibration of the digital image signal can be carried out. At this stage, the compensation data within the compensation memory unit 115 can be transmitted to the buffer 120 in a burst mode. Thereafter, the compensation data within the buffer 120 can be read out serially by the image processor 110 in one data cluster at a time. Digital image signals processed by the image processor 110 are transferred to the buffer 125, one data cluster at a time. According to this invention, the image archiving memory unit 130 can receive and store the processed image data inside the buffer 125 in a burst mode transmission. Since the input/output device 140 can only transmit data one cluster at a time, a buffer 135 is set up between the image archiving memory unit 130 and the input/output device 140. Consequently, digital image data can be transmitted from the image archiving memory unit 130 to the buffer 135 in a single burst. Finally, when the processed digital image signals need to be output to some other external device, for example, a computer, the data can be relayed to the external device from the input/output device 140 serially.

Note that the buffer is preferably a first-in-first-out storage device but is not restricted as such. Moreover, there is no need to install all the buffers described in the embodiment of this invention inside the scanner.

Figure 2:
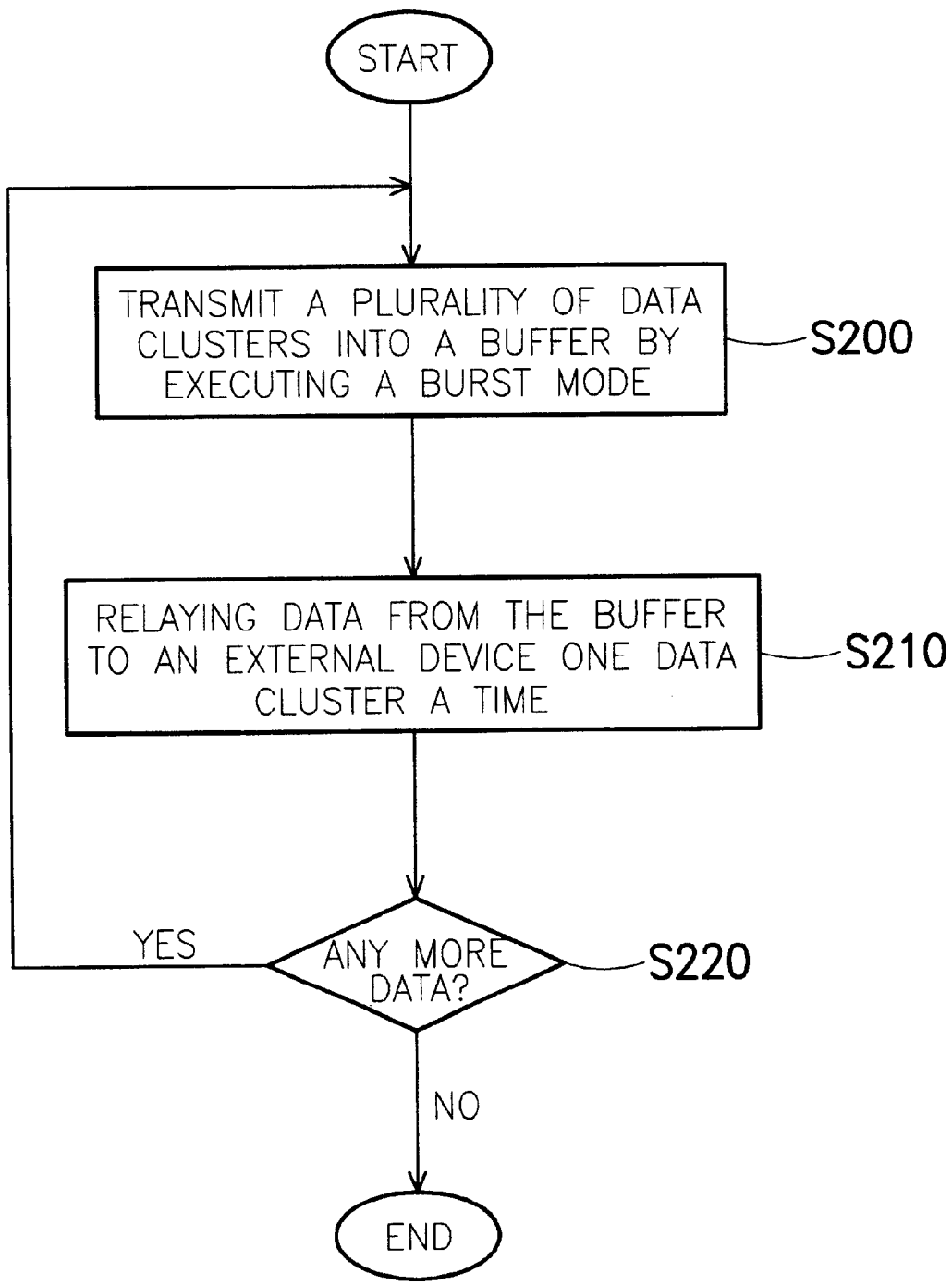
FIG. 2 is a flow chart showing the steps for operating the SDRAM scanning system according to a first preferred embodiment of this invention.

FIG. 2 is a flow chart showing the steps for operating the SDRAM scanning system according to a first preferred embodiment of this invention. A buffer is provided between a SDRAM and a single data cluster access device. As shown in FIG. 2, a burst mode is executed to transmit data from the SDRAM to the buffer in step S200. Data are next transmitted from the buffer to a corresponding single data cluster access device serially in step S210, one data cluster at a time. In step S220, the SDRAM is checked to determine if there are any digital image data waiting to be transmitted. If there are, control returns to step S200 to repeat the flow. If there are no more digital data, the flow is terminated.

Figure 3:
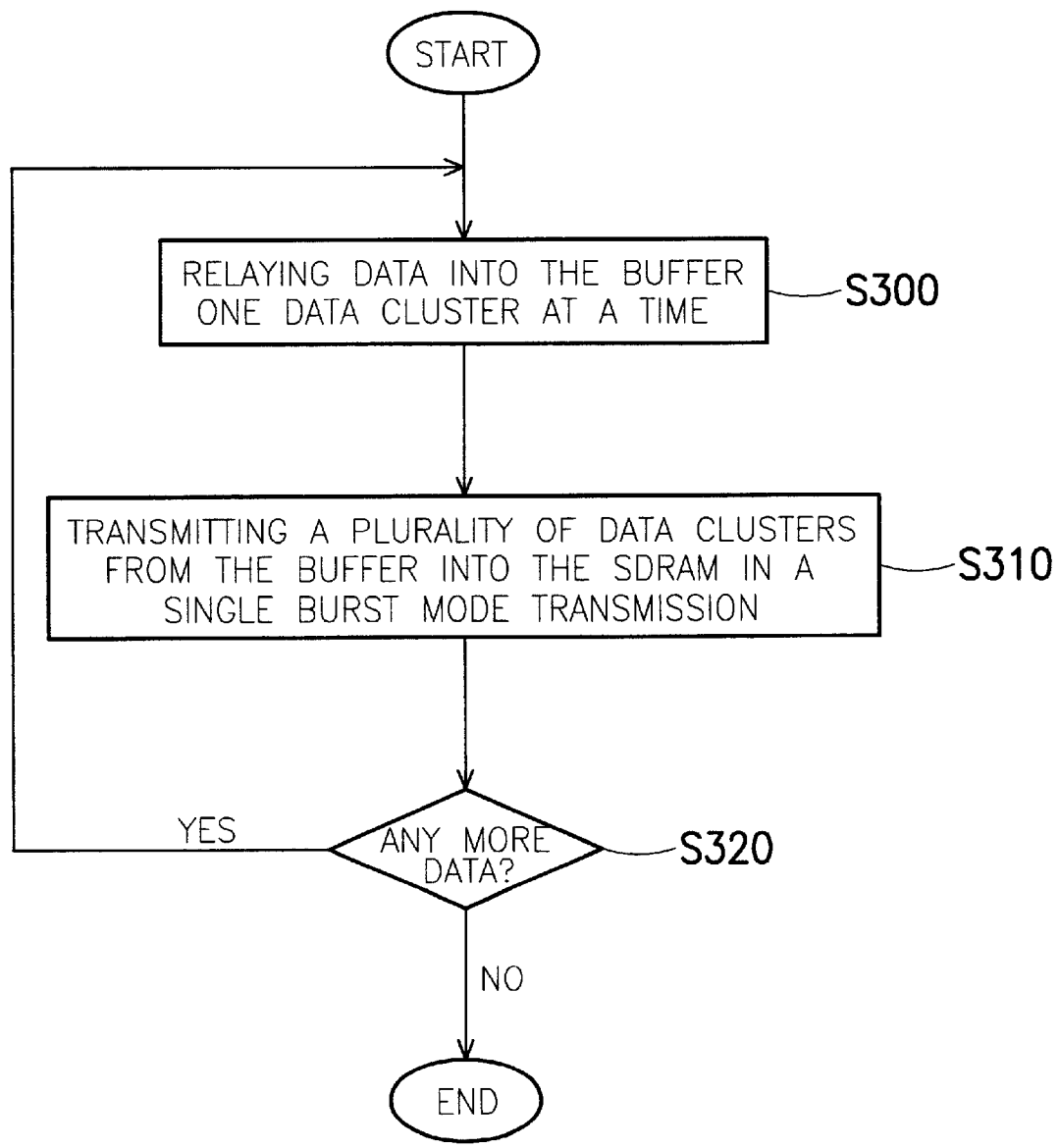
FIG. 3 is a flow chart showing the steps for operating the SDRAM scanning system according to a second preferred embodiment of this invention.

FIG. 3 is a flow chart showing the steps for operating the SDRAM scanning system according to a second preferred embodiment of this invention. A buffer couples a SDRAM with a single data cluster access device. As shown in FIG. 3, data are transmitted from the single data cluster access device to the buffer serially in step S300, one data cluster at a time. The SDRAM executes a burst mode to read the data from the buffer in step S310. In step S320, the single data cluster access device is checked to determine if there are any digital image data waiting to be transmitted. If there are, control returns to step S300 to repeat the flow. If there are no more digital data, the flow is terminated.

Note that since the buffer must hold all the data transmitted during a burst mode transmission, the buffer must have a memory capacity of at least such a magnitude.

In conclusion, a major advantage of the invention is the full utilization of the burst mode of a SDRAM so that the scanner can operate at a higher scanning speed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanner with a synchronization dynamic random access memory (SDRAM), comprising:

an image processor for processing digital image signals;

a compensation memory unit, wherein the compensation memory is a synchronization dynamic random access memory for holding compensation data;

an image archiving memory unit, wherein the image archiving memory unit is a synchronization dynamic random access memory for holding digital image data after processing by the image processor;

input/output device for transmitting data with an externally connected device; and a plurality of buffers, wherein the buffers respectively couple the compensation memory unit with the image processor, the image processor with the image archiving memory unit, and the image archiving memory unit with the input/output device.

2. The scanner of claim 1, wherein the buffer further includes:

a first buffer coupled to the compensation memory unit and the image processor, wherein compensation data are transmitted to the first buffer in a burst mode and then the data are relayed to the image processor serially;

a second buffer coupled to the image processor and the image archiving memory unit, wherein the processed image digital image data are relayed to the second buffer serially and then transmitted from the second buffer to the image archiving memory unit in a burst mode; and a third buffer coupled to the image archiving memory unit and the input/output device, wherein the processed digital image data are transmitted to the third buffer in a burst mode and then relayed from the third buffer to the input/output device serially.

3. The scanner of claim 1, wherein each of the buffers is a first-in-first-out type of storage component.

4. A scanner with a synchronization dynamic random access memory, comprising:

a single data cluster access device capable of accessing a single cluster of to data at a time;

a synchronization dynamic random access memory (SDRAM) capable of transmitting a plurality of data clusters simultaneously in a burst mode; and a buffer coupled to the single data cluster access device and the SDRAM, wherein the buffer is capable of transmitting a single cluster of data with the single data cluster access device and transmitting a plurality of data clusters with the SDRAM in a burst mode transmission.

5. The scanner of claim 4, wherein the single data cluster access device includes an image processor.

6. The scanner of claim 4, wherein the single data cluster access device includes an input/output device.

7. The scanner of claim 4, wherein the buffer is a first-in-first-out type of storage component.

8. The scanner of claim 7, wherein the single data cluster access device includes an image processor.

9. The scanner of claim 7, wherein the single data cluster access device includes an input/output device.

10. A memory access method for a scanner having a synchronization dynamic random access memory (SDRAM) capable of transmitting a plurality of data clusters in a burst mode transmission, comprising the steps of:

providing a buffer capable of holding the amount of data in a burst mode transmission;

transmitting a plurality of data clusters from the SDRAM to the buffer by executing a burst mode; and serially relaying the data inside the buffer to an external data device.

11. A memory access method for a scanner having a synchronization dynamic random access memory (SDRAM) capable of transmitting a plurality of data clusters in a burst mode transmission, comprising the steps of:

providing a buffer capable of holding an amount of data in a burst mode transmission;

serially relaying data from an external device to the buffer; and transmitting a plurality of data clusters from the buffer to the SDRAM by executing a burst mode.

* * * * *